Dec. 26, 1939.   DE WITT R. GODDARD   2,184,958
ELECTROMECHANICAL DRIVE
Filed March 20, 1935   3 Sheets-Sheet 1

INVENTOR
DeWITT R. GODDARD
BY H. S. Grover
ATTORNEY

Dec. 26, 1939.    DE WITT R. GODDARD    2,184,958
ELECTROMECHANICAL DRIVE
Filed March 20, 1935      3 Sheets-Sheet 2

INVENTOR
DeWITT R. GODDARD
BY
ATTORNEY

Dec. 26, 1939.   DE WITT R. GODDARD   2,184,958
ELECTROMECHANICAL DRIVE
Filed March 20, 1935   3 Sheets-Sheet 3

INVENTOR
DeWITT R. GODDARD
BY
ATTORNEY

Patented Dec. 26, 1939

2,184,958

UNITED STATES PATENT OFFICE 2,184,958

ELECTROMECHANICAL DRIVE

De Witt Rugg Goddard, Riverhead, N. Y., assignor to Radio Corporation of America, a corporation of Delaware Application March 20, 1935, Serial No. 11,915

10 Claims. (Cl. 74—204)

This invention relates to a new combined electrical and mechanical drive which is particularly adapted to remote control purposes.

An object of this invention is to simplify and improve the art of electromechanical drives.

Another object of this invention is to provide a new, novel and useful drive for adjusting a variable condenser, variable inductance, multi-contact switch, or any other type of apparatus requiring rotary motion.

Still another object of this invention is to provide a system for remotely controlling apparatus requiring rotary motion.

A further object of this invention is to provide a system for driving or reversing the direction of any type of apparatus requiring rotary motion by employing either electromagnetic means of a thermostatic arrangement wherein the motion may be controlled either in combination with the electromechanical drive or by the thermostatic arrangement alone.

A still further object of this invention is to provide a system for slow speed operation of remotely controlling apparatus requiring rotary motion.

A feature of this invention is the extreme simplicity of magnetically controlling and altering the direction of rotation of an improved electromechanical drive.

Briefly, this improved drive consists of a prime mover which is coupled by a flexible coupling to a relatively long shaft. There is located on each side of the drive shaft two electromagnets, a central armature guides the guide shaft toward one of the magnets which happens to be energized. The speed of the prime mover or electric motor is guided by a suitable rheostat. The motor is started or stopped by suitable switching means, the switches being arranged so that the direction of rotation of the prime mover is determined by the energy flowing through its magnets. The apparatus to be driven by this improved drive is controlled by a disk having a slot concentrically arranged just inside its periphery. The long drive shaft revolves within the above-mentioned slot and rotates the disk by frictional engagement, the direction of its rotation being determined by the drive shaft rotating either on the inside periphery of the inside or outside flange of the disk.

The ratio of the diameter, the disk being high compared with the shaft diameter, allows a considerable amount of overrun of the motor, without greatly changing the device to be controlled, and also may provide vernier-like action to the system.

This invention will be more completely understood by referring to the accompanying drawings, in which Fig. 1 shows a schematic diagram of the improved drive;

Figure 1:
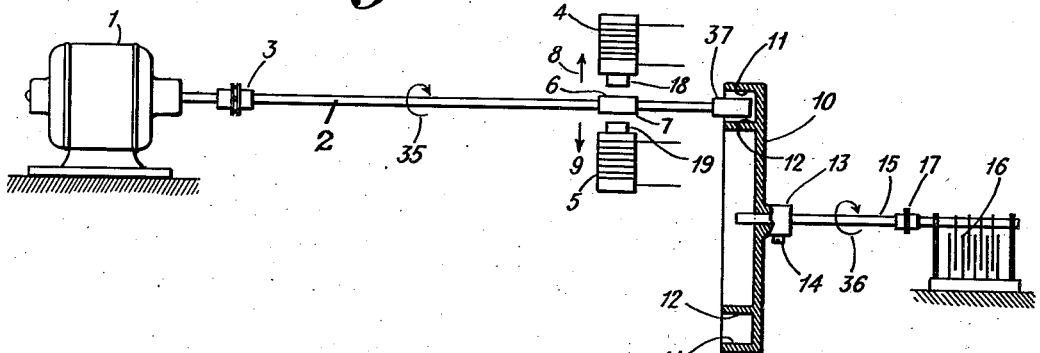
Figure 2:
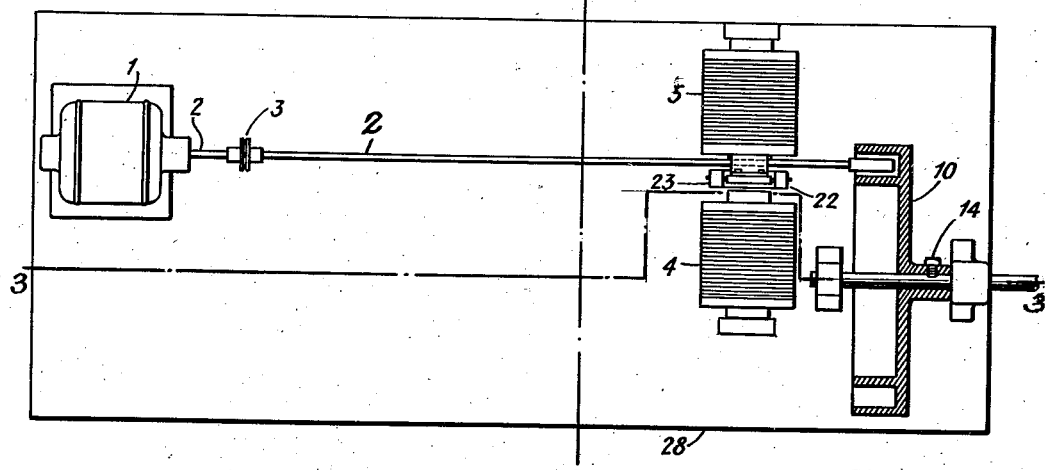
Fig. 2 is a plan view of an embodiment of this invention.
Figure 3:
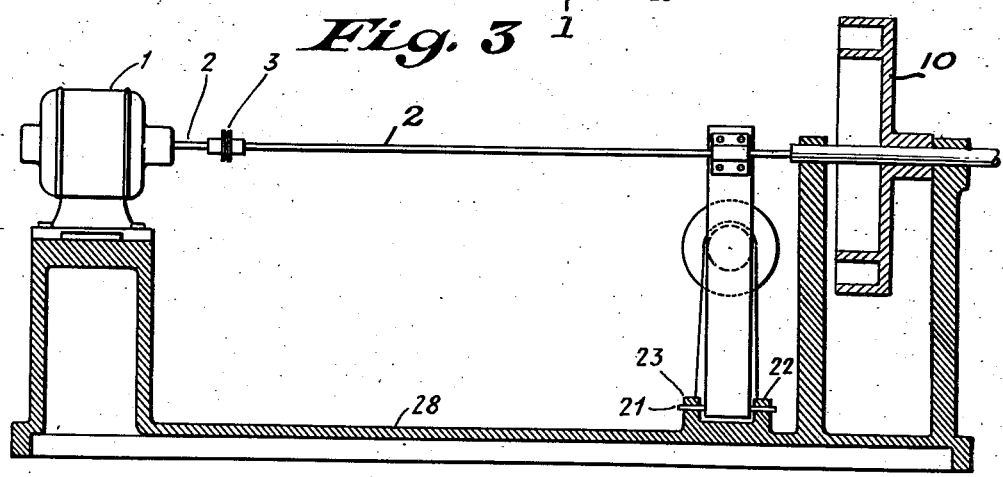
Fig. 3 is a side view of Fig. 2, partly in section, the section being taken on line 3—3 of an embodiment of this invention.
Figure 4:
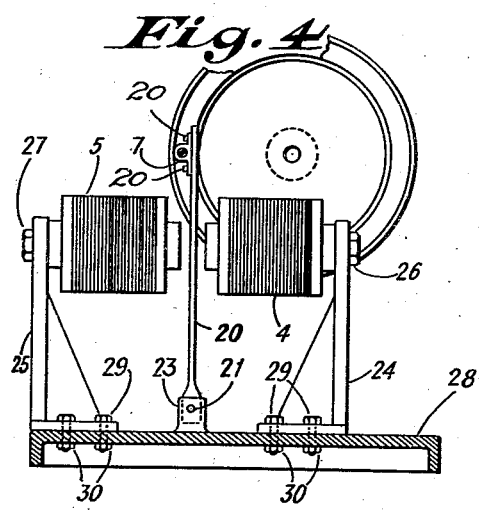
Fig. 4 is a section of Figs. 1 and 2, the section being taken on lines 1—1.

Referring now in detail to Figs. 1, 2, 3, and 4, a prime mover or electric motor 1 is connected to the long drive shaft 2 through a flexible coupling 3, the drive shaft being guided by any suitable bearing means at a point substantially central with the magnets 4 and 5, the bearing being located on the armature 6. The armature 6 is suitably arranged at its lower extremity by any suitable pivoting means which would allow the bearing 7 and the shaft 2 to move in the directions indicated by the arrows 8 and 9 whose direction is determined by the energization of magnets 4 and 5. The extremity of the drive shaft 2 is located within a slot formed in the disk 10 by the outer periphery of flange 11 and the inner flange 12. The disk 10 is provided with a hub 13 having suitable retaining means 14, such as a set screw for retaining a shaft 15 which rotates the variable condenser 16. A flexible coupling 17 may be provided to insure suitable coupling between the disk 10 and the variable condenser or the device whose rotation is to be controlled.

The slot formed by the flanges 11 and 12 is of such a size that will permit the end of the long drive shaft 2 to rotate freely. The armature 6 is preferably a flat, soft iron bar passing between the pull pieces 18 and 19 of the electromagnets 4 and 5. The bearing 7 is securely fastened to the upper portion of armature 6 by any suitable means such as screws or rivets 20. The lower portion of armature 6 is pivoted by means of a pivot 21 and pivot guides 22 and 23. The electromagnets 4 and 5 are supported by brackets 24 and 25, the magnets being retained to the brackets by bolts 26 and 27. A base 28 is provided for securing the motor drive shaft rotating disk and electromagnets in their respective operating positions. The magnet supports 24 and 25 are secured to base 28 by any suitable means, such as bolts 29 and nuts 30.

Figure 6:
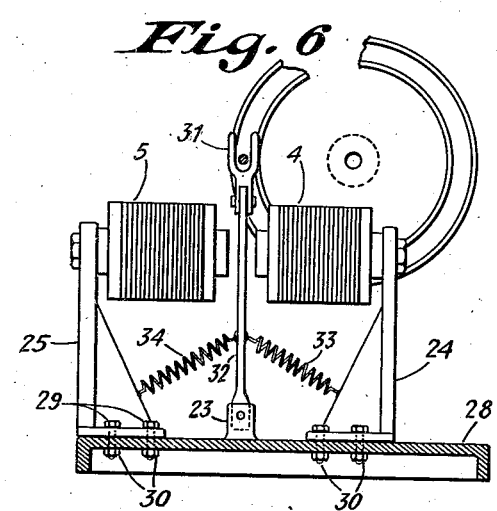
Fig. 6 is a section of Fig. 5, the section being taken on lines 2—2.
Figure 5:
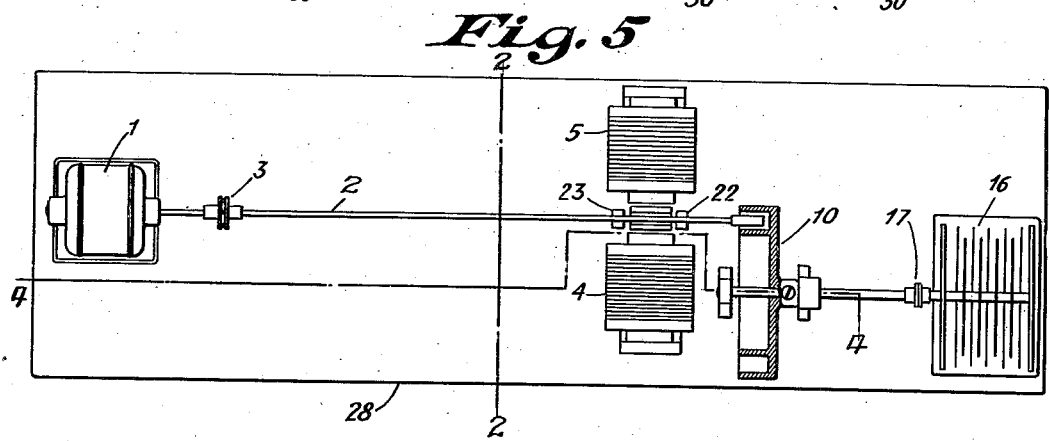
Fig 5 is a plan view of another modification of this invention.
Figure 7:
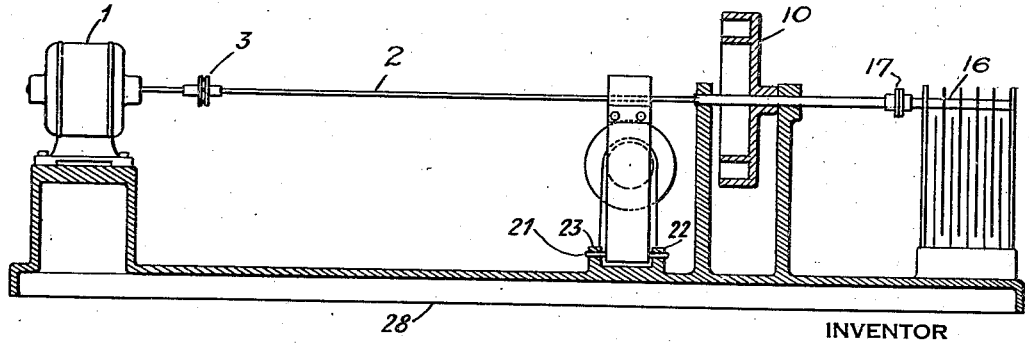
Fig. 7 is a side view of Figs. 5 and 6, partly in section, the section being taken on lines 4—4 showing the shaft arranged to operate a gang of variable condensers.

The modification shown by Figs. 5, 6, and 7, is in general similar to that shown by Figs. 1 to 4, inclusive, except the long drive shaft 2 is arranged centrally between the magnets 4 and 5 by means of a bearing 31 formed by the U-shaped end of the armature 32, the armature 32 being retained in a neutral position between magnets 4 and 5 by equalizing springs 33 and 34. In this neutral position the armature will be located in a central position with respect to the flanges 11 and 12 so that there will be no rotation of the variable element 16.

Figure 9:
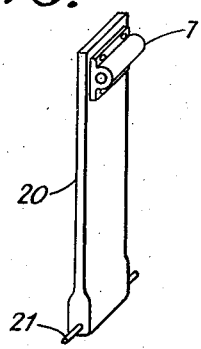
Fig. 9 is a plan view of the rotating disk.

The disk shown in Fig. 9 is made of any suitable metal having the requisite strength and bearing qualities, and is properly balanced to insure uniform and vibrationless rotation at the higher speeds.

Figure 8:
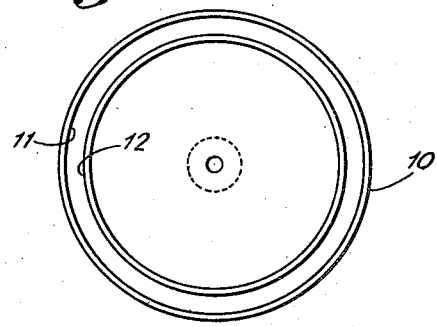
Fig. 8 is a perspective view of the armature which is energized by the magnets.

The armature shown by Fig. 8 is made preferably of a soft iron bar having sufficient magnetic qualities to be attracted by magnets 4 and 5 and yet not have any residual magnetism which would prevent its immediate release from the attraction of either of the magnets, which would naturally make the operation of the device sluggish.

Figure 10:
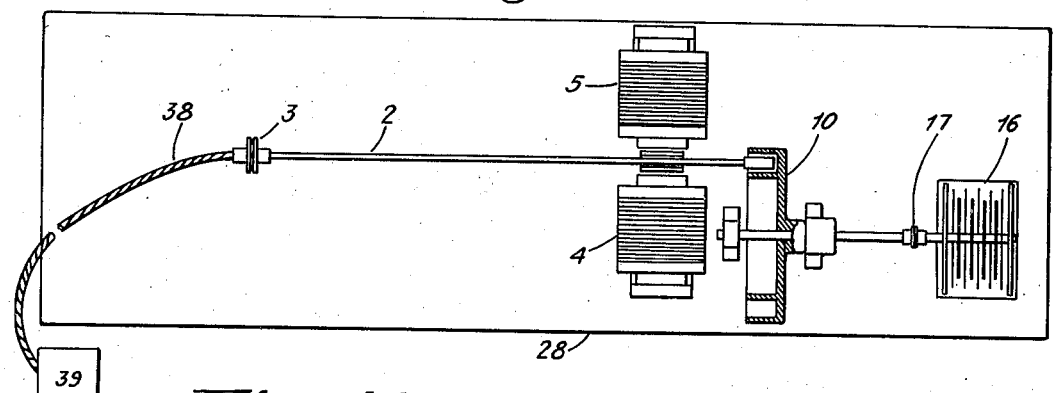
Fig. 10 is a plan view similar to Fig. 2 except the magnets, armature and disk are controlled by a flexible drive shaft.

The modification shown in Fig. 10 is an arrangement wherein the flexible drive shaft 38 which may be located at any convenient point for remotely driving the shaft 2 by any suitable motor or prime mover 39.

Figure 11:
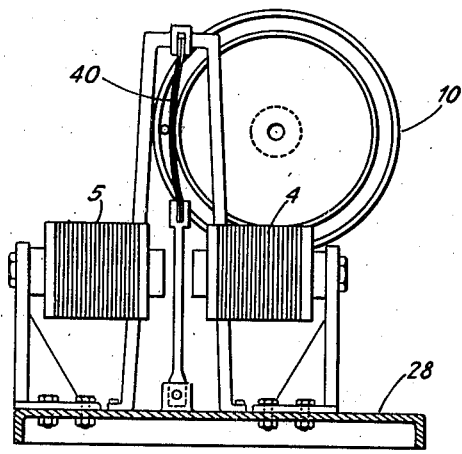
Fig. 11 is an arrangement similar to Fig. 2, except for the addition of a bimetallic strip which is combined with the armature.

In Fig. 11 the armature is a composite arrangement of a bimetallic strip 40 which is set up with the armature so that it may be maintained in a normal temperature position. The bimetallic strip has the inherent characteristics of a snap action and any desired change in temperature may cause the bimetallic strip to snap over to one side or the other to change the movement or rotation of disk 10. Furthermore, by this arrangement the rotation of the device 16 to be controlled may be controlled either by the magnets 4 and 5 or the bimetallic strip 40 acting separately or a combined action may be accomplished by suitably setting up the component parts so that the magnets 4 and 5 may control the desired direction and when a desired change in temperature is reached, the rotation may be either stopped or its direction reversed.

Figure 12:
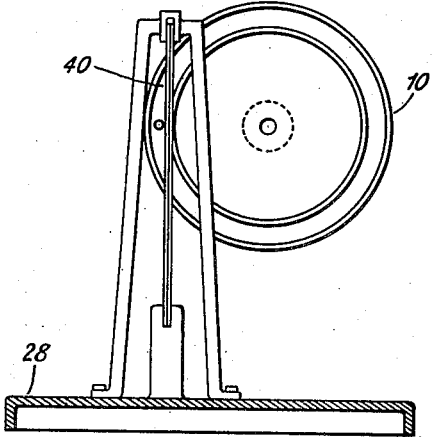
Fig. 12 is an arrangement similar to Fig. 2, except the armature and magnets are substituted by a bimetallic strip.

Fig. 12 shows a modification wherein the armature and magnets are substituted by an operative element in the form of a bimetallic strip having the inherent characteristics of a snap action, the desired temperature causing the disc to snap to either one side or the other. In this arrangement the rotation is controlled by any desired change in temperature. The entire system otherwise operates in the same manner as the device in which electromagnets are employed.

The operation of this improved electromechanical drive is as follows:

When the motor 1 is rotating in the direction indicated by the arrow 35, and assuming that magnet 4 is energized, the armature 6 will be drawn toward that magnet causing the long drive shaft 2 to bear against the outer flange 11. This will cause the disk 10 to rotate as indicated by arrow 36 and thus move any device which may be attached to it, such as the variable condenser indicated at 16. If the magnet 4 be de-energized and the magnet 5 energized, then the bar or armature 6 will be pulled toward magnet 5, bringing the long drive shaft in contact with the inner flange 12, thus reversing immediately the direction of the rotation of disk 10 and the variable condenser 16.

The operation of the arrangement shown in Figs. 11 and 12 is similar to that mentioned above, except when a desired temperature is reached the bimetallic strip 40 will actuate the bar or armature 6 to either stop or reverse the direction of rotation of disk 10 and the variable element 16.

For installations requiring but a relatively slow rotation and limited torque, a synchronous electric motor, such as a clock motor, may supply the necessary power. The end of the long drive shaft 2 will make a better contact engagement against the flanges 11 and 12 if a tight-fitting piece of rubber hose 37 is slipped over the extreme end of the shaft which bears against the flanges. Whenever a more positive drive than that obtained by frictional engagement is required, a small pinion gear may be substituted for the rubber tube and internal gear teeth cut in flange 11 with teeth also cut in inner flange 12 of the corresponding pitch as the pinion gear.

For larger installations the current operating the magnets can be arranged to turn on the driving motor 1, and if a time relay is used with a single lag, the magnets 4 and 5 can be suitably arranged to engage the pinion gear on the end of the shaft with the teeth in the flanges 11 and 12 of the rotating disk 10 before the motor starts.

While this invention has been described by the above modifications, it is of course to be understood that there are a great number of variations which will suggest themselves to anyone familiar with such equipment and it is distinctly understood that this invention should not be limited except as to such limitations as are clearly imposed in the appended claims.

I claim:

1. An electromechanical friction drive particularly adapted for remotely controlling a device to be driven by an electric motor comprising a rotatable shaft flexibly coupled directly to said electric motor for rotation therewith and located in the same plane of rotation as said electric motor and the device to be driven, a pivoted armature coupled to said rotatable shaft, said armature supporting said shaft, a bearing for said shaft, a disc member having an inner and an outer flange coupled to said device to be driven, a magnet located on each side of said armature and adjacent said disc member with means to actuate the armature so that said rotatable shaft will rotate against either surface of the inner and outer flange to drive the device to be driven, and equalizing springs on each side of said armature for retaining it in a neutral position when said magnets are not energized.

2. An electromechanical friction drive for remotely controlling a device to be driven by an electric motor comprising a rod-like element flexibly coupled directly to and in the same plane of rotation as said electric motor, a pivoted armature linked to said rod-like element, a separate electromagnet located on each side of said armature, each electromagnet being separately energized, a bearing for said rod-like element located at one end of said armature, a disc member coupled to said device to be driven and located adjacent said magnets, said disc having an inner and an outer flange, a rod-like element arranged to engage either the inner or the outer flange of said disc member so as to drive the device to be driven, the direction of rotation of said disc being determined by the attraction of said armature and actuated by said electromagnets so as to be capable of engaging with either the inner or outer flange of said disc.

3. An electro-mechanical friction drive for remotely controlling a device to be driven by an electric motor mounted on said base member comprising a rod-like element flexibly coupled to and in the same plane of rotation as said electric motor, an armature linked to and having bearing means on said base for said rod-like element, a pivot supporting said armature and located on said base member, a separate electromagnet located on each side of said armature and intermediate said motor and device to be driven, a disc member having an inner and an outer flange coupled to said device to be driven and located adjacent said magnets, said rod-like element having means for engaging either the inner or the outer flange of said disc-like member to frictionally drive said device to be driven, its direction of rotation being determined by attraction of said armature actuated by said electromagnets so as to engage either the inner or outer flange of said disc member.

4. An electromechanical friction drive for remotely controlling a device to be driven by an electric motor comprising a rod-like element flexibly coupled to and in the same plane of rotation as said electric motor, an armature linked to and having bearing means on said base for said rod-like element, a pivot supporting said armature and located on said base member, a separate electromagnet located on each side of said armature and intermediate said motor and device to be driven, said device to be driven located in the same plane of rotation as said electric motor, a disc member having an inner and an outer flange coupled to said device to be driven and located adjacent said magnets, said rod-like element having means for engaging either the inner or the outer flange of said disc-like member to frictionally drive said device to be driven, its direction of rotation being determined by attraction of said armature actuated by said electromagnets so as to engage either the inner or outer flange of said disc member.

5. In a frictional transmission and electrical control means therefor comprising a rotatable disc member having an inner and an outer flange, a rotatable shaft having one end thereof located between said flanges, an armature adjacent said disc member and having an end in engagement with said shaft, a separate electromagnet each side of said armature, and means for selectively energizing said magnets whereby the end of said shaft is selectively engaged with said inner and outer flanges.

6. In a frictional transmission and electrical control means therefor comprising a rotatable disc member having an inner and an outer flange, a rotatable shaft having one end thereof located between said flanges, an armature adjacent said disc member and having an end in engagement with said shaft, a separate electromagnet each side of said armature and parallel to the plane of said disc member, and means for selectively energizing said magnets whereby the end of said shaft is selectively engaged with said inner and outer flanges.

7. In a frictional transmission and electrical control means therefor comprising a rotatable disc member having an inner and an outer flange, a rotatable shaft having one end thereof located between said flanges, an armature adjacent said disc member and having its upper end in engagement with said shaft and the lower end pivoted, a separate electromagnet each side of said armature, and means for selectively energizing said magnets whereby the end of said shaft is selectively engaged with said inner and outer flanges.

8. In a frictional transmission and electrical control means therefor comprising a rotatable disc member having an inner and an outer flange, a rotatable shaft having one end thereof located between said flanges, an armature adjacent said disc member and having an end in engagement with said shaft, a separate electromagnet each side of said armature, and means for selectively energizing said magnets whereby the end of said shaft is selectively engaged with said inner and outer flanges, and resilient means located each side of said armature for retaining it in a neutral position when said electromagnets are not energized.

9. In a frictional transmission and electrical control means therefor comprising a rotatable disc member having an inner and an outer flange, a rotatable shaft having one end thereof located between said flanges, an armature adjacent said disc member and having an end in engagement with said shaft, a separate electromagnet each side of said armature, means for selectively energizing said magnets whereby the end of said shaft is selectively engaged with said inner and outer flanges, and a spring member located each side of said armature for retaining it in a neutral position when said electromagnets are not energized.

10. In a frictional transmission and electrical control means therefor comprising a rotatable disc member having an inner and an outer flange, a rotatable shaft having one end thereof located between said flanges, an armature adjacent said disc member and having a U-shaped member at its upper end for positioning the end of said shaft in engagement between said flanges, a separate electromagnet each side of said armature, means for selectively energizing said magnets whereby the end of said shaft is selectively engaged with said inner and outer flanges, and a spring member located each side of said armature for retaining it in a neutral position when said electromagnets are not energized.

DE WITT RUGG GODDARD.